United States Patent
Medbo et al.

(10) Patent No.: US 10,848,190 B2
(45) Date of Patent: Nov. 24, 2020

(54) RECEIVING DEVICE AND METHOD PERFORMED THEREIN FOR HANDLING SIGNALING IN A WIRELESS COMMUNICATION NETWORK

(71) Applicant: Telefonaktiebolaget LM Ericsson (publ), Stockholm (SE)

(72) Inventors: Jonas Medbo, Uppsala (SE); Henrik Asplund, Stockholm (SE); Peter Ökvist, Luleå (SE); Arne Simonsson, Gammelstad (SE); Magnus Thurfjell, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/334,228

(22) PCT Filed: Oct. 11, 2016

(86) PCT No.: PCT/SE2016/050978
§ 371 (c)(1),
(2) Date: Mar. 18, 2019

(87) PCT Pub. No.: WO2018/070907
PCT Pub. Date: Apr. 19, 2018

(65) Prior Publication Data
US 2019/0260406 A1  Aug. 22, 2019

(51) Int. Cl.
*H04B 1/10* (2006.01)
*H04B 17/318* (2015.01)
(Continued)

(52) U.S. Cl.
CPC ......... *H04B 1/1027* (2013.01); *H04B 7/0857* (2013.01); *H04B 17/318* (2015.01);
(Continued)

(58) Field of Classification Search
CPC .. H04B 1/1027; H04B 17/318; H04B 17/373; H04B 7/0857; H04L 27/265; H04W 24/04
See application file for complete search history.

(56) References Cited

U.S. PATENT DOCUMENTS 6,240,291 B1   5/2001  Narasimhan et al.
2004/0204918 A1  10/2004  daCosta
(Continued)

OTHER PUBLICATIONS

International Search Report and Written Opinion dated Jun. 30, 2017 for International Application No. PCT/SE2016/050978 filed on Oct. 11, 2016, consisting of 10-pages.

*Primary Examiner* — Janice N Tieu
(74) *Attorney, Agent, or Firm* — Patent Portfolio Buiders, PLLC

(57) ABSTRACT

Embodiments herein relate to a method performed by a receiving device for handling signalling in a wireless communication network. The receiving device measures a strength, or a complex amplitude, of one or more signals over a signal path to a transmitting device, which measured strength or complex amplitude forms a signal pattern over a time. Furthermore, the receiving device matches the signal pattern with a stored signal pattern and, if the signal pattern matches the stored signal pattern, the receiving device determines whether an object will block the signal path between the receiving device and the transmitting device.

13 Claims, 8 Drawing Sheets

(51) Int. Cl.
*H04B 17/373* (2015.01)
*H04B 7/08* (2006.01)
*H04L 27/26* (2006.01)
*H04W 24/04* (2009.01)

(52) U.S. Cl.
CPC ......... *H04B 17/373* (2015.01); *H04L 27/265* (2013.01); *H04W 24/04* (2013.01)

(56) References Cited

U.S. PATENT DOCUMENTS

| | | | |
|---|---|---|---|
| 2008/0020706 A1 | 1/2008 | Payne et al. | |
| 2009/0207925 A1* | 8/2009 | Liu | H04B 1/1036 375/260 |
| 2009/0225918 A1* | 9/2009 | Telukuntla | H04W 56/0035 375/360 |
| 2009/0312005 A1* | 12/2009 | Mukundan | H04L 1/0002 455/422.1 |
| 2010/0317289 A1* | 12/2010 | Desai | H04B 17/318 455/41.2 |
| 2017/0241790 A1* | 8/2017 | Yoshikawa | G01C 21/3446 |

* cited by examiner

RECEIVING DEVICE AND METHOD PERFORMED THEREIN FOR HANDLING SIGNALING IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2016/050978, filed Oct. 11, 2016 entitled "RECEIVING DEVICE AND METHOD PERFORMED THEREIN FOR HANDLING SIGNALING IN A WIRELESS COMMUNICATION NETWORK," the entirety of which is incorporated herein by reference.

TECHNICAL FIELD

Embodiments herein relate to a receiving device and method performed therein regarding wireless communication. Furthermore, a computer program and a computer readable storage medium are also provided herein. In particular, embodiments herein relate to handling signaling, e.g. managing signaling or performing signaling, in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into areas or cell areas, with each area or cell area being served by a radio network node such as an access node e.g., a Wi-Fi access point or a radio base station (RBS), which in some networks may also be called, for example, a "NodeB" or "eNodeB". The area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

In a wireless communication network, blocking objects between a wireless device and a radio network node such as an access node may degrade radio conditions rapidly. When a distance to the blocking object is limited, the increase of the path loss can be very sharp when going from a line-of-sight situation to a situation being shadowed by an object, denoted as a blocking object. The blocking loss for a path is well captured by a diffraction model which also means that the transition from a non-blocked state to a blocked state becomes more rapid in higher frequency bands.

Fifth Generation (5G) access is expected to be a Time Division Duplex (TDD) access at higher frequency bands utilizing beamforming with high gain beams to enhance a so called link budget i.e. accounting of all of the gains and losses from the transmitter, through the medium, to the receiver. When the wireless device is blocked behind obstacles several features can be used to mitigate the excess loss from the blocking and overcome the total path loss to maintain a coverage and service level. Examples amongst others are power control, link adaptation, handover and beam selection; these features are typically, at least partly, based on measurements done by the wireless device and reported to the radio network node which in turn executes the feature.

5G access targets a short packet delay and mission critical applications. Hence, when a propagation path becomes blocked, a rapid reconfiguration may be required, e.g. by switching beams to illuminate a different, non-blocked, propagation path.

The electromagnetic interaction between an object's surface and a radio wave will result in certain scattering patterns, according to scattering theory. FIG. 1 shows numerical simulation of the scattering of a plane wave, i.e. a radio wave, onto a conducting cylindrical object. In this specific example, the object consists of a metallic pole of infinite length with a diameter being three times a wavelength, λ, of the incoming radio wave.

Approaching the shadowed area downstream the object, i.e. entering the "blocking area" behind the object, your physical measure, typical received signal strength or path loss, will demonstrate an oscillation with increasing amplitude and also increasing wavelength. If you go behind the blocking object at a distance of 50 times the wavelength, your measured signal strength will resemble the envelope of the wave along the lower dashed line. Said oscillation pattern depends on the radio carrier frequency, distance between shadowing object and the detector, and object and detector's intrinsic velocity, i.e. the velocity can be both of the blocking object and/or the wireless device velocity.

There is typically a delay from detection of a blocking situation to that a mitigation process is executed. For example, the link adaptation selects a Modulation and coding Scheme (MCS) based on a measurement that is 5-10 ms old. When rapid increase of path loss occurs from blocking, this MCS selection will often result in a block error requiring one or more Hybrid Automatic Repeat Request (HARQ) retransmissions, or in worse case a Radio Link Control (RLC) retransmission.

An RLC retransmission results in a significant increase of the packet delay, and such packet delays will make it more difficult to maintain service quality for mission critical applications. Thus, blocking objects can cause severe delay of transmissions from wireless devices and network nodes leading to a limited performance of the wireless communication network.

SUMMARY

An object of embodiments herein is to provide a mechanism that improves the performance of the wireless communication network by mitigating the effect of blocking objects.

According to an aspect the object is achieved by providing a method performed by a receiving device for handling signalling in a wireless communication network. The receiving device measures a strength, or a complex amplitude, of one or more signals over a signal path to a transmitting device, which measured strength or complex amplitude forms a signal pattern over a time. The receiving device matches the signal pattern with a stored signal pattern. The receiving device determines, in case the signal pattern matches the stored signal pattern that an object will block the signal path between the receiving device and the transmitting device.

According to another aspect the object is achieved by providing a receiving device for handling signalling in a wireless communication network. The receiving device is configured to measure a strength, or a complex amplitude, of one or more signals over a signal path to a transmitting device, which measured strength or complex amplitude forms a signal pattern over a time. Furthermore, the receiving device is configured to match the signal pattern with a stored signal pattern; and in case the signal pattern matches the stored signal pattern; to determine that an object will block the signal path between the receiving device and the transmitting device.

It is herein also provided a computer program comprising instructions, which, when executed on at least one processor, causes the at least one processor to carry out the methods herein, as performed by the receiving device. Furthermore, it is herein provided a computer-readable storage medium, having stored thereon a computer program comprising instructions which, when executed on at least one processor, cause the at least one processor to carry out the methods herein, as performed by the receiving device.

Pattern recognition is used herein to detect when a wireless device is approaching the shadowed region behind a blocking object or approaching an object that will block the signal path between the receiving device and the transmitting device. Prior to blocking of a signal path between the receiving device and the transmitting device, a ripple pattern over time in measured physical properties caused by a nearby blocking edge occurs. The ripple pattern may be identified. One method of predicting blocking objects, i.e. a pre-blocking detection, is exemplified and illustrated herein using e.g. Fast Fourier Transform (FFT), or Discrete Fourier Transform (DFT), of path loss. The occurrence of the blocking of a path may be detected prior to that a path loss increase occurs, which in turn enables initiation of signal processing, such as link adaptation, handover or beam allocation to act proactively. For TDD, the signal pattern can be detected in uplink for mitigation of downlink degradation prior blocking.

Embodiments herein maintain high link performance despite Line of Sight (LoS), or similar strong reflection, conditions rapidly, and potentially frequently, being cut off. Furthermore, shorter delay for wireless communication network features is enabled and it is possible to maintain short packet delay continuously. These advantages, one by one or in combination, result in an improved performance of the wireless communication network.

BRIEF DESCRIPTION OF THE DRAWINGS

Embodiments will now be described in more detail in relation to the enclosed drawings, in which.

DETAILED DESCRIPTION

Figure 2:
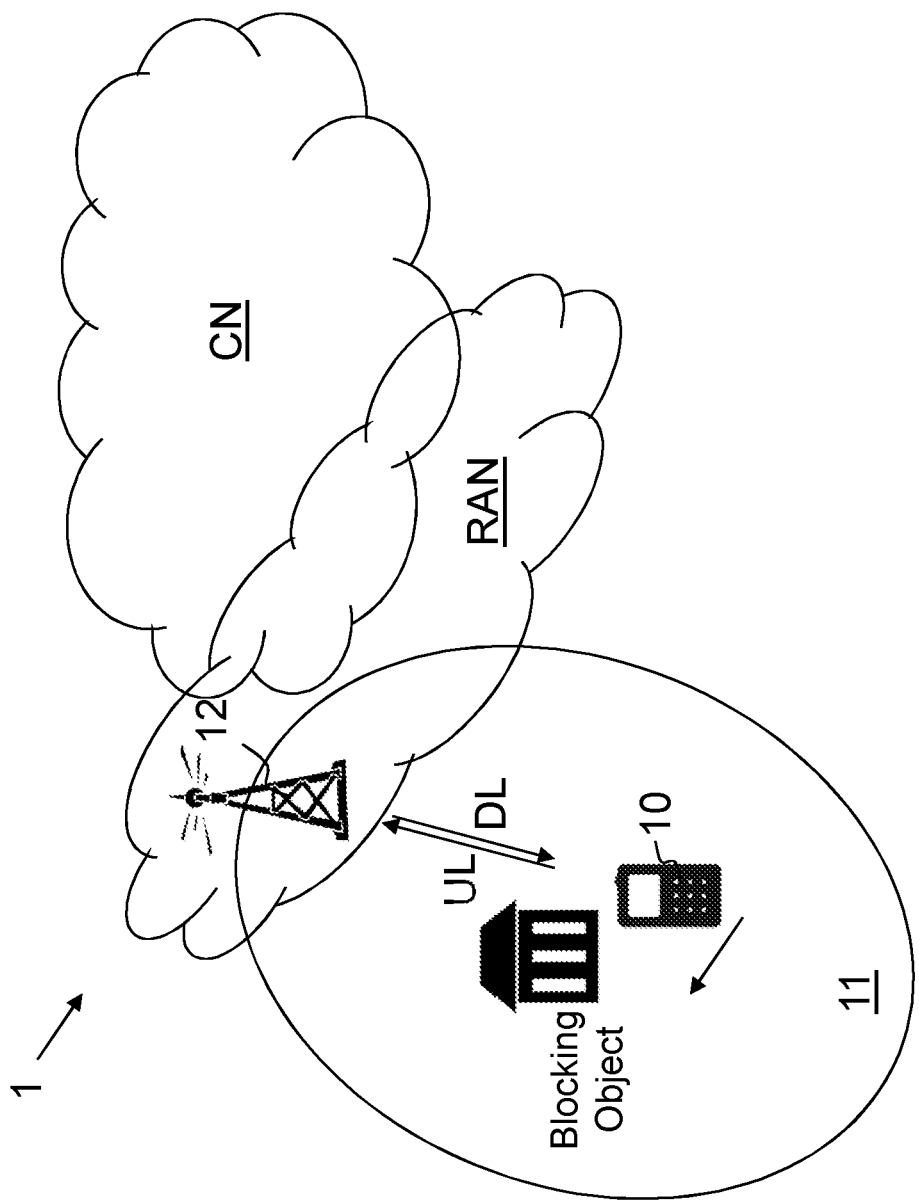
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first network node 12 providing radio coverage over a geographical area, a first service area 11 or first cell, of a first radio access technology (RAT), such as LTE, WiMAX or similar. The first network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first network node may be referred to as a serving network node wherein the first cell may be referred to as a serving cell, and the serving network node communicates with the wireless device 10 in form of DL transmissions to the wireless device 10 and UL transmissions from the wireless device 10.

It should be noted that a service area may be denoted as cell, beam, beam group or similar to define an area of radio coverage. The first and second RAT may be the same RAT.

According to embodiments herein the wireless device 10 moves around in the wireless communication network 1 and continuously measures signals in the wireless communication network 1. As blocking objects may reduce the performance of the wireless communication network, e.g. due to delaying transmissions, embodiments herein provide a manner of detecting a blocking object, illustrated as a building in FIG. 2, early and thereby enable triggering of a signal process to deal with upcoming blocking objects. The wireless device 10 is an example of a receiving device and the radio network node 12 is an example of a transmitting device. However, in some embodiments the radio network node 12 is an example of a receiving device and the wireless device 10 is an example of a transmitting device. The wireless device 10 may perform pattern recognition to detect when the wireless device 10 is approaching a signal shadowing behind the blocking object. The wireless device 10 measures a strength, or a complex amplitude, of one or more signals over a signal path to the radio network node 12. The signal path is thus between the receiving device and the transmitting device. The measured strength or complex amplitude forms a signal pattern over a time or time interval, also referred to as a ripple pattern or a signal pattern varying over time. The strength or complex amplitude indicates a path loss of the signal path. Thus, the ripple pattern, over time, of e.g. a path loss in measured and physical properties caused by a nearby blocking edge is identified by comparing or matching the signal pattern with a stored signal pattern. The receiving device then determines, when the signal pattern matches the stored signal pattern that an object will, is expected to block, or predicted to block the signal path between the receiving device and the transmitting device.

One method of blocking prediction, i.e. pre-blocking detection, is exemplified below and illustrated using Fast Fourier Transformation (FFT) of path loss as function of time but any other spectral analysis method may be used.

Hence, the blocking object can be detected prior the path loss increase occurs, which in turn enables radio features such as link adaptation, handover or beam allocation, to act proactively. For TDD, the pattern can be detected in uplink for mitigation of downlink degradation prior blocking.

Embodiments herein maintain high link performance despite Line of Sight (LoS) conditions rapidly, and potentially frequently, being cut off.

Figure 1:
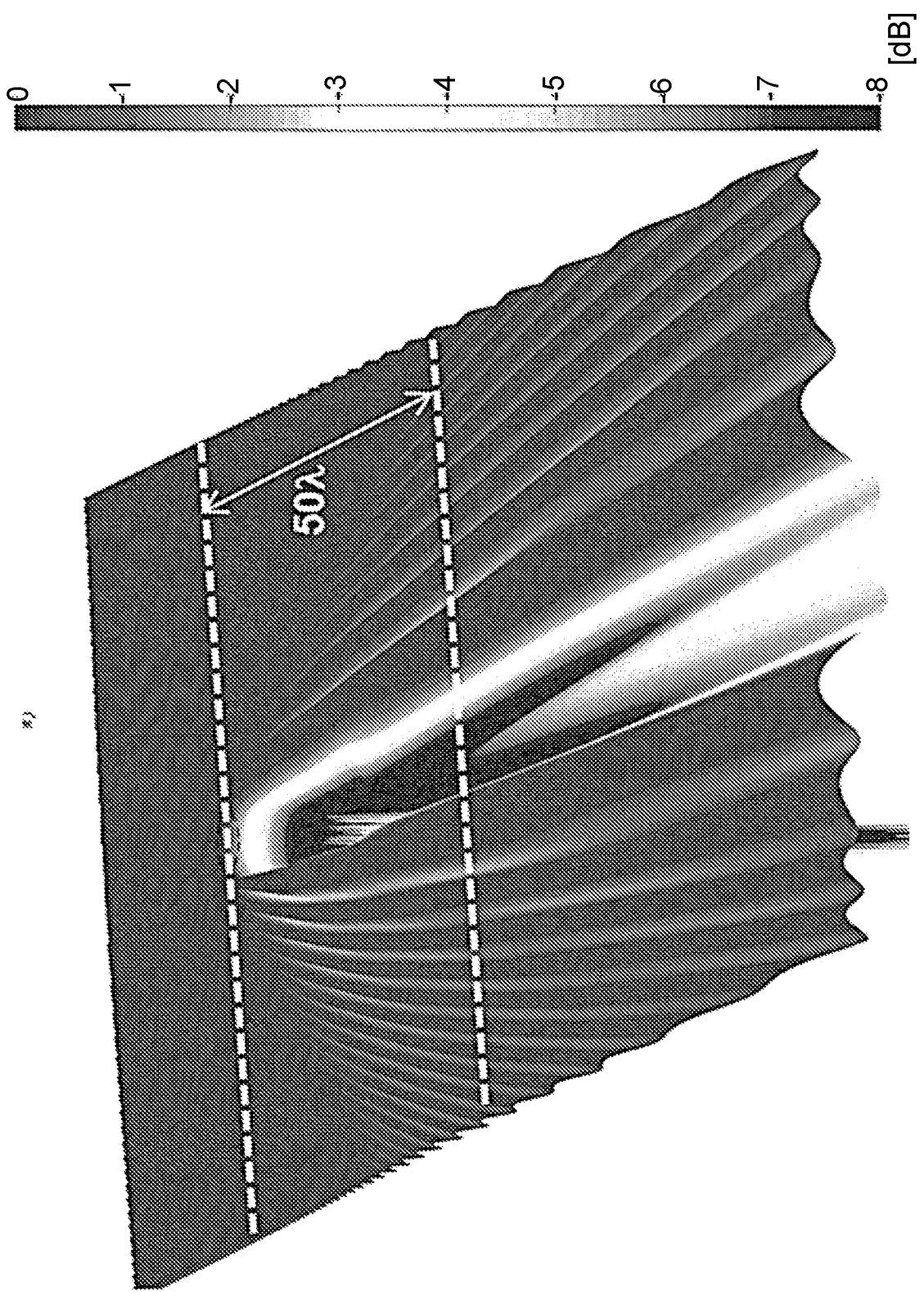
FIG. 1 shows a simulation of a scattering of a radio wave onto a conducting cylindrical object.
Figure 3:
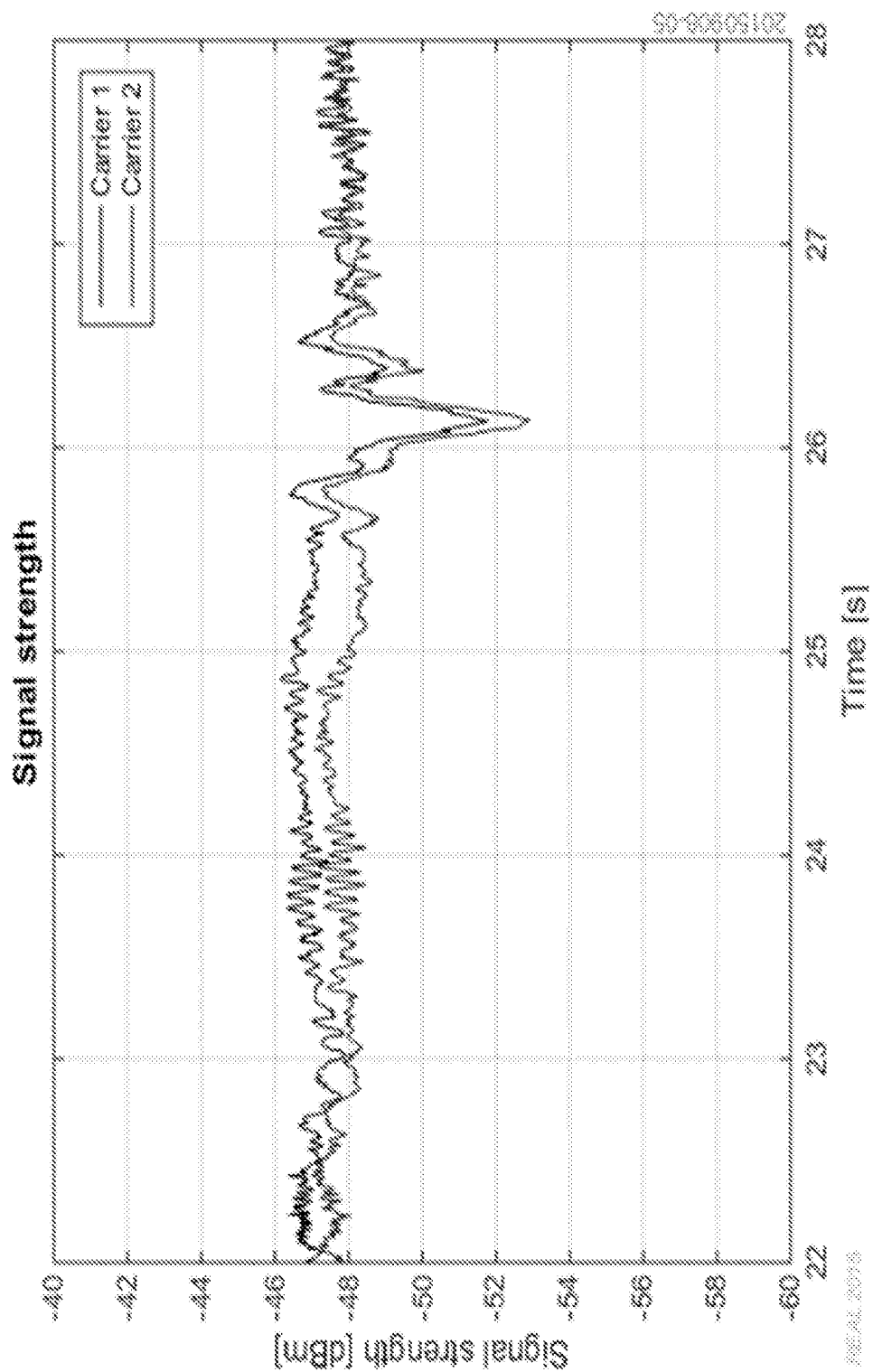
FIG. 3 shows a diagram depicting measurements of signal strength as the wireless device is passing 1 m behind a metallic pole with a speed of 0.5 m/s.

FIG. 3 shows results in terms of received signal strength from measurements at 15 GHz carrier frequency when the wireless device 10 is passing approximately 1 m behind a metallic pole; the distance between the wireless device 10 and the pole corresponds to 50 times the carrier wavelengths. During the time interval 25-27 s, it is more or less exactly the oscillation pattern as suggested by scattering theory illustrated in FIG. 1; measurement data around time 26 s is almost a perfect match to the theoretical envelope of the 50λ-dashed line in FIG. 1.

This further means that this signal pattern, occurring when approaching an area behind a blocking object, can be detected, and in turn, used to mitigate the radio quality drop before it impacts link performance.

Figure 4:
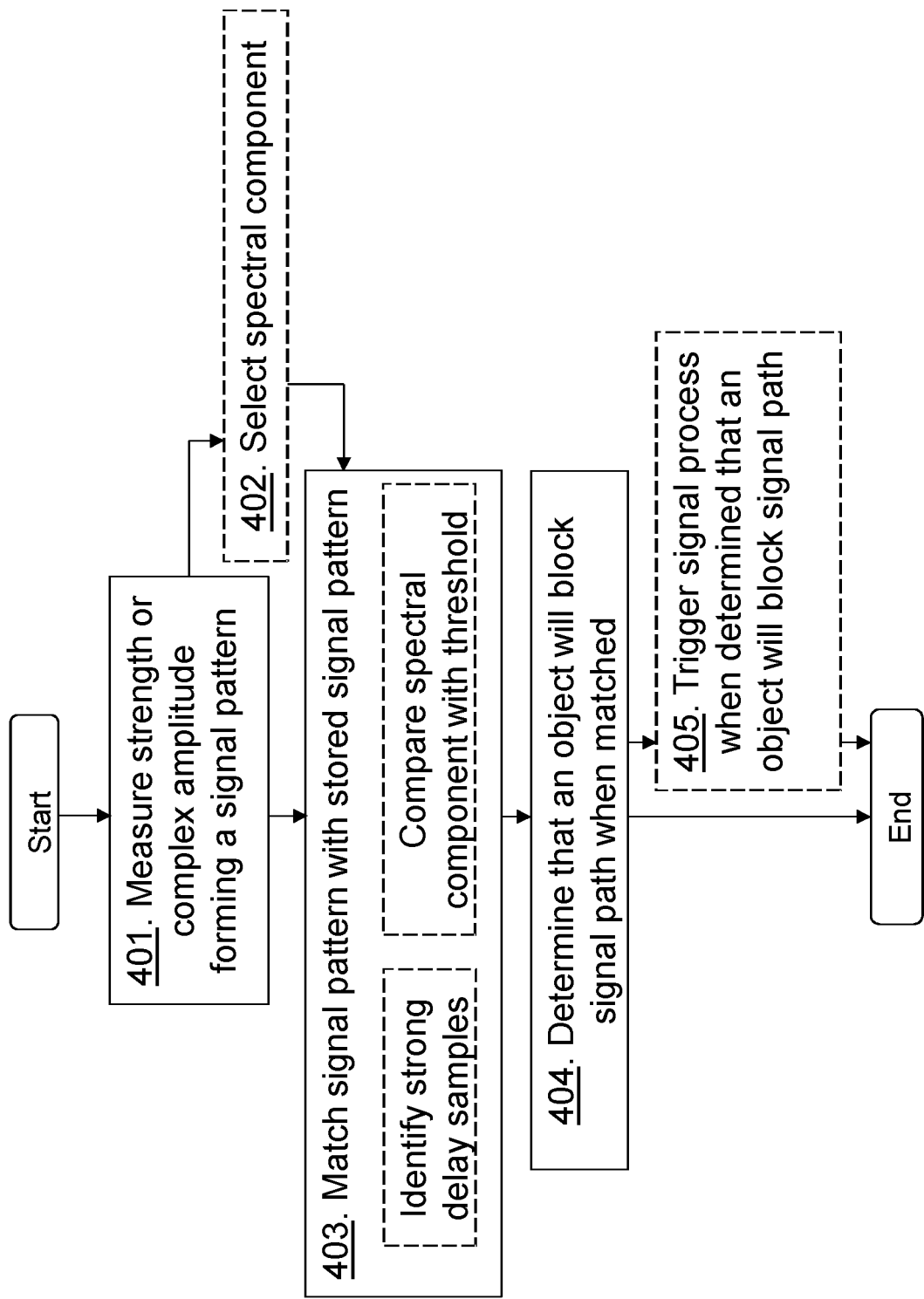
FIG. 4 is a schematic flowchart depicting a method performed by a receiving device according to embodiments herein.

FIG. 4 is a schematic flowchart depicting a method performed by the receiving device, such as the wireless device 10 or the radio network node 12, for handling signaling, e.g. managing signaling or performing signaling, in the wireless communication network 1 according to embodiments herein. The actions do not have to be taken in the order stated below, but may be taken in any suitable order. Actions performed in some embodiments are marked with dashed boxes.

Action 401.

The receiving device measures the strength or the complex amplitude of one or more signals over the signal path to the transmitting device, such as the radio network node 12. The measured strength or complex amplitude forms the signal pattern over the time. E.g. the wireless device 10 measures the path loss, from the measured strength or complex amplitude, of one or more signals over the signal path to the radio network node 12. The measured path loss forms the signal pattern. The receiving device may e.g. measure a signal strength or quality over a time interval forming the signal pattern over a time interval. For example, measure Reference signal Received Power (RSRP), Signal to Noise Ratio (SNR), signal to interference plus noise ratio (SINR), Reference signal received quality (RSRQ), or similar.

Action 402.

The receiving device may select one or several spectral components, also called taps herein being an example of frequency components, by means of Discrete Fourier Transformation (DFT), FFT or any equivalent method, as a trigger based on monitoring peak-to-average ratio of a spectral component method output. E.g. an FFT may be performed over signal strength samples in time inside a window sliding with time. The receiving device may select a suitable FFT tap as a trigger based on monitoring peak-to-average ratio of the FFT output.

Action 403.

The receiving device matches the signal pattern with the stored signal pattern. This may be performed by e.g. FFT of received signals strength/path loss, as will be described below, or pattern matching of e.g. Fresnel integrals, whose simultaneous parametrization are illustrated by an Euler spiral, a.k.a. Cornu spiral. The receiving device may match the signal pattern with the stored signal pattern by identifying strong delay samples corresponding to carrier frequency blocking. The receiving device may e.g. use pattern recognition to identify a blocking edge. Thus, the receiving device may match the patterns by comparing the one or several spectral components, by e.g. means of DFT or FFT, of the one or more signals with a threshold and when exceeding the threshold, the signal pattern matches the stored signal pattern. The receiving device may match the patterns by comparing the FFT tap, e.g. FFT tap 3, of the one or more signals with a tap threshold and when exceeding the tap threshold the signal pattern matches the stored signal pattern. Matching or pattern recognition may thus be made by FFT or DFT of path loss identifying strong delay samples corresponding to carrier frequency blocking. The stored signal pattern may be relating to time variation of strength or complex amplitudes of signals in a vicinity of an object, potentially blocking signals towards the receiving device. This stored signal pattern may be configured from the radio network node, preconfigured or similarly.

Action 404.

In case the signal pattern matches the stored signal pattern, the receiving device determines that an object will block the signal path between the receiving device and the transmitting device. This is also referred to as block prediction, wherein the receiving device predicts that the object will affect the signal path and determines that the object will or is expected to block the transmitting device.

Action 405.

In case it is determined that the object will block the signal path between the receiving device and the transmitting device, e.g. determined that a blocking object is approaching or that the receiving device approaches an area that is obscured by the blocking object, the receiving device may trigger a signal process to avoid signal interruption by taking into account that the object will block the signal path, e.g. indicate that the blocking object is approaching. The signal process may comprise one or more of: apply an increased code rate, apply a higher transmit power, initiate a search for alternative cells, initiate a search for alternative transmission antennas, initiate a search for alternative transmit antenna array beamforming weights, and transmit an indication of the blocking object to the transmitting device. The receiving device may thus activate a mitigation process, being an example of the signal process, to eliminate or limit the service impact of path loss increase. Example of signal processes in e.g. the wireless device 10 may be: Power control, i.e. increased transmit power; Allocating Handover measurement resources, such as trigger sending of handover report or increased handover measurement frequency; and Beamforming adaptation, such as activating a backup/alternative beam to be used if the presently used beam becomes blocked; or the like. The activation could encompass initiating pilot transmissions in a secondary beam. Examples performed by the receiving device when being the radio network node may be: Scheduling, such as sending packets to wireless devices approaching blocking with higher priority; Adjusting Power control; Performing Beamforming adaptation, such as activating a backup/alternative beam to be used if the presently used beam becomes blocked; or the like. The activation could encompass initiating pilot transmissions in a secondary beam; and initiating usage of more Multiple Input Multiple Output (MIMO) transmission layers given that channel rank might increase if dominating LoS beam is blocked.

Furthermore, the receiving device may trigger a signal process at the transmitting device by transmitting an indication to the transmitting device, hence, the receiving device may indicate that the object will block the signal path between the receiving device and the transmitting device by transmitting an explicit indication or just reporting the deviations from the compared stored signal pattern. The transmitting device may then perform a mitigation/signal process such as Increasing channel coding; Scheduling, such as sending packets to wireless devices approaching blocking with higher priority; Adjusting Power control; Performing Beamforming adaptation, such as activating a backup/alternative beam to be used if the presently used beam becomes blocked. The activation could encompass initiating pilot transmissions in a secondary beam; and initiating usage of more Multiple Input Multiple Output (MIMO) transmission layers given that channel rank might increase if dominating LoS beam is blocked.

Figure 5:
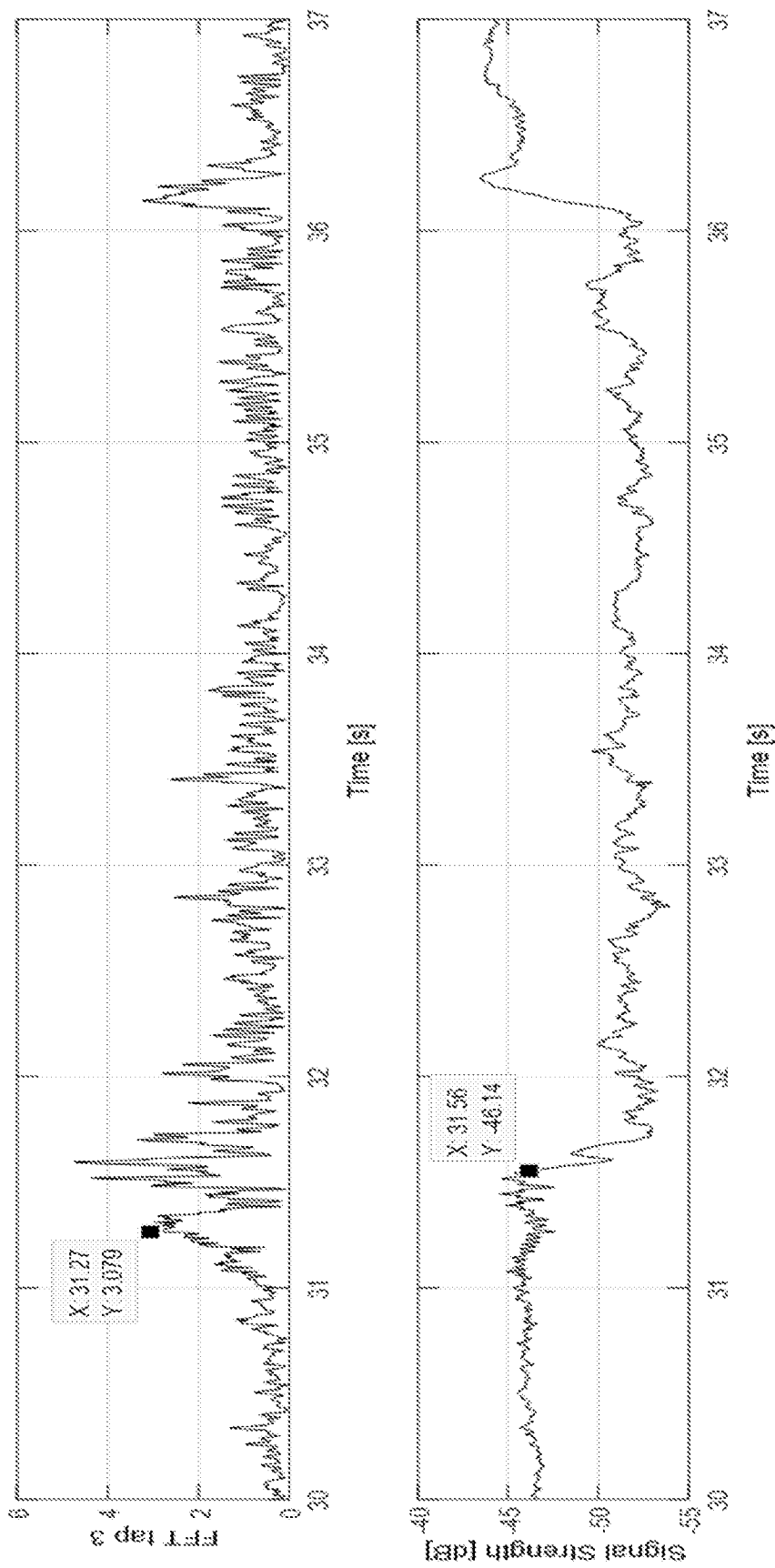
FIG. 5 shows diagrams depicting measurements of signal strength and FFT tap 3 for detecting block object according to embodiments herein.

The pattern recognition in action 402 above can be done for example by applying an FFT of path loss. FIG. 5 illustrates an example where said FFT approach is applied on a measurement on 15 GHz when a truck is passing the wireless device 10 by blocking at typically 4-5 m with vehicle speed of ~25 km/h.

The signal strength is sampled for each 5 ms and the FFT is applied on a sliding window of 10 samples/50 ms. With a more elaborated hardware solution, sampling rates could be increased, hence improving indicated detection performance.

Using tap 3 of the FFT output, i.e. equivalent to the 40 Hz frequency component, as blocking detection measure, a clear increase of chosen indicator is observed prior the blocking itself and its corresponding 8 dB drop of signal strength.

FIG. 5 shows that blocking starts at 31.56 s and given that said indicator can be observed at time 31.27 s; this means that using an energy detection level equal to 3, tap 3, i.e. energy accumulated over the corresponding frequency bin, as triggering condition, suggested blocking mitigation can be triggered 290 ms prior the sharp drop of signal strength. Hence, FIG. 5 shows blocking prediction example of the tap 3 of the FFT output measured on a truck passing by at 15 GHz, blocking starts at 31.56 s and the indicator can be observed at time 31.27 s, i.e. 290 ms in advance.

False detections are also observed, in this case observed in the end of the blocking as seen in FIG. 5 after 36 s; such false detections can easily be filtered out based on the increase of signal strength.

Figure 6:
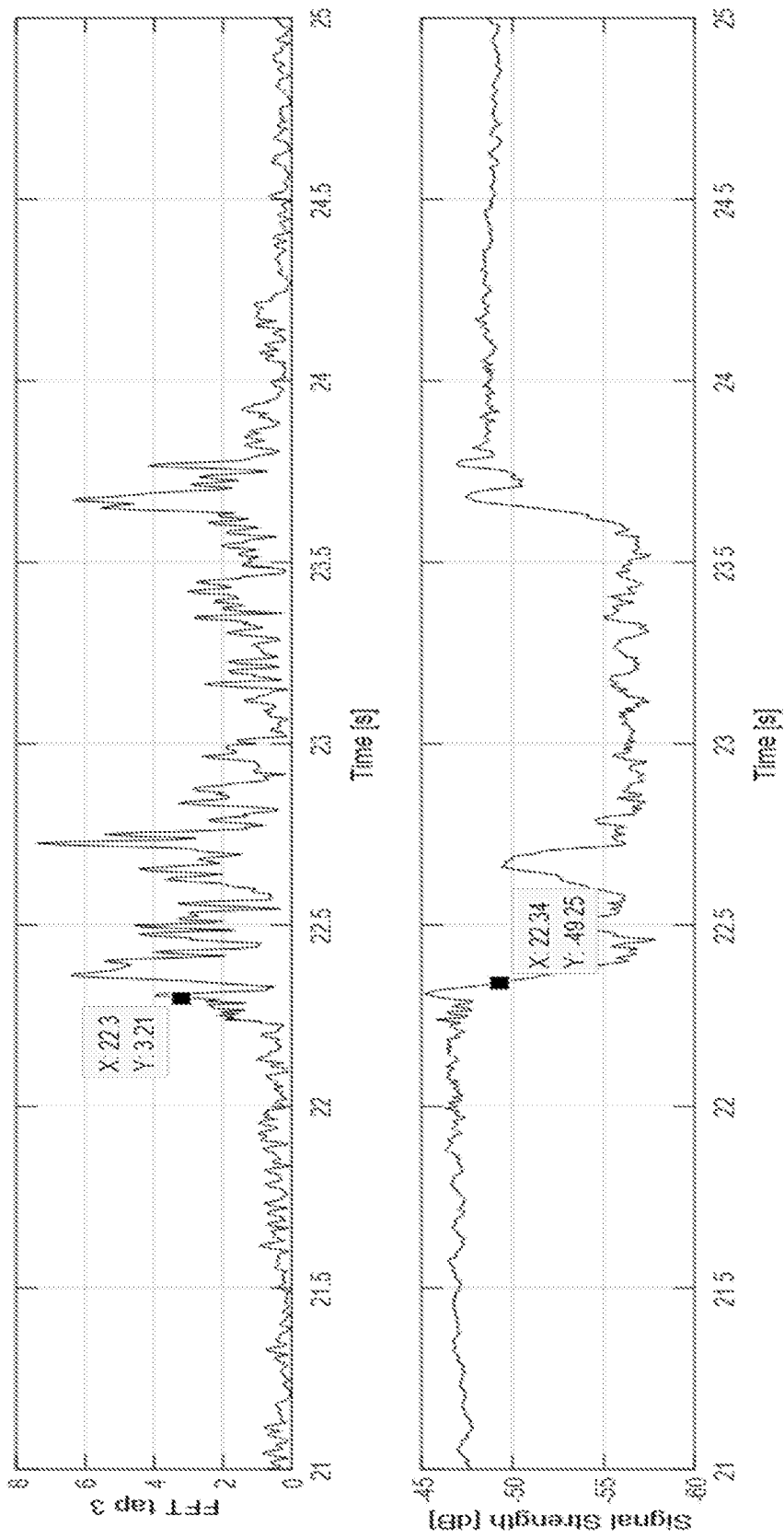
FIG. 6 shows diagrams depicting measurements of signal strength and FFT tap 3 for detecting block object according to embodiments herein.

FIG. 6 shows another such example with another truck passing by at 4-5 m with ~25 km/h. In this example, using tap 3 energy detection level equals to 3 as triggering condition will not indicate the blocking very early in this case. With a slightly lower trigger threshold, e.g. tap 3 energy detection level equals to 2, emerging blocking will be detected at 22.30 s given the blocking occurring at 22.34 s, i.e. providing an indication ~40 ms prior the sharp drop. With current assumption of 0.2 ms Transmission Time Interval (TTI) length for a NX 5G network, said ahead indication comes 200 TTIs before actual getting blocked. Hence, FIG. 6 shows a blocking prediction example 2, FFT tap 3 measured on truck passing by at 15 GHz, blocking starts at 22.34 s and the indicator can be observed at time 22.30 s, i.e. 40 ms in advance.

Selection of which FFT tap to be used for blocking detection trigger will depend on a used carrier frequency, a path loss measurement sampling rate and a typical (relative) speed between detecting the wireless device 10 and the blocking object.

It is also dependent on above mentioned aspects but also in combination with the desired prediction advance; the higher frequency resolution/sampling rate and sampling window, the better will the prediction in general be. In practice though, an arbitrary long sampling window cannot be selected as too much noise will be included with a window significantly longer that searched for triggering patterns.

As previously stated, a sliding window of 10 samples/50 ms is assumed. With more hardware available a feasible approach can be to test for several sampling window lengths in parallel. It is plausible that a more frequent sampling rate is expected in a representative wireless device or radio network node implementation.

The two examples in FIG. 5 and FIG. 6 are for relatively slowly moving vehicle and the exemplifying selection of FFT tap 3, i.e. the 40 Hz frequency component, shows to be a good measure. For detection of slower speeds, such as for the wireless device 10 in walking speed approaching a stationary blocking object, a slower path loss variation frequency is expected and a different tap, or taps, typically at lower frequencies, are expected to provide better measures; on the other hand, at slower speed the normal measurement procedure may be fast enough and the advantage with early detection is smaller.

A working embodiment using a FFT method for blocking detection when the receiving device is the wireless device 10 may be performed as the following:
The wireless device 10 measures path loss
The wireless device 10 further applies FFT on signal strength
The wireless device 10 measures expected blocking pattern taps of the FFT output, such as tap 3 for the 15 GHz case above,
If the level of the tap exceeds a specified threshold the wireless device 10 triggers the signal process such as a mitigation process.

Relative speeds that are to be involved in future blocking situations may not be known, and establishing a trigger mechanism on more than one FFT tap, i.e. frequency component, would thereby be desirable. By monitoring a subset of the FFT taps, say 3 to 6, most real-world relative speeds can be catered for; for even faster blocking objects/situations, a prediction algorithm will likely not improve overall performance as the "time saved with the prediction" will in practice be significantly shorter than inherited wireless device/network signalling delays.

Figure 7:
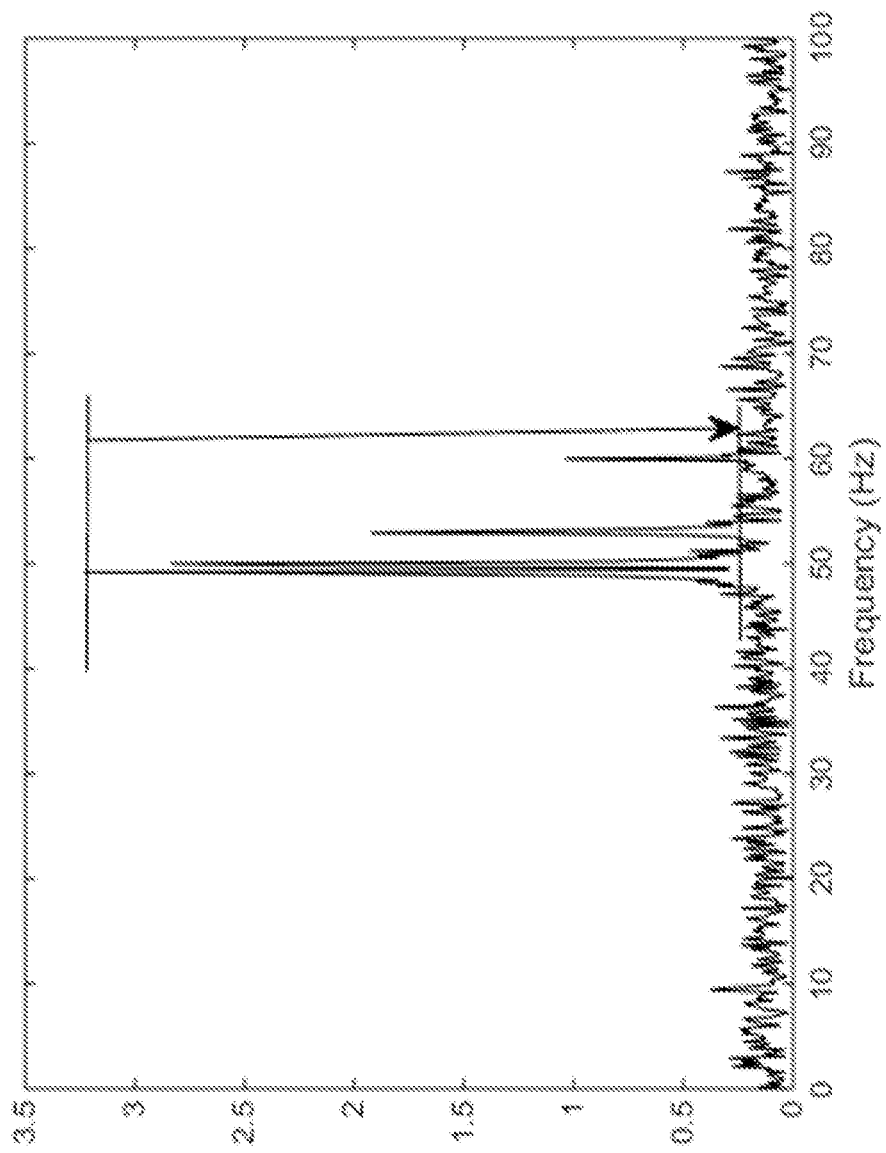
FIG. 7 shows a diagram depicting monitoring peak-to-average ratio of the FFT output for selection of FFT tap.

In a further embodiment, monitoring peak-to-average ratio of the FFT output can be used to identify what frequency range to be considered; as exemplified in FIG. 7, a certain FFT peak-to-average threshold could be applied to indicate what FFT frequency taps to consider as blocking trigger indicators. In said example, frequencies in the range of 45-53 Hz contains information, and related to above described setup this would correspond to FFT taps 3.

FIG. 7 shows FFT spectrum 'peak to average' to identify FFT frequency trigger components.

In conclusion, with exemplified FFT parameter setting applied to representative real-life measurement examples, information of an emerging signal blocking situation can be achieved 40-290 ms in advance. With current assumptions of NX 5G TTI length such time gaps correspond to 200-1450 TTIs, which should be enough time to effectively launch any of the exemplified signal processes. In a further embodiment, FFT tap selection could be properly accomplished considering monitoring peak-to-average ratio of the FFT output.

Figure 8:
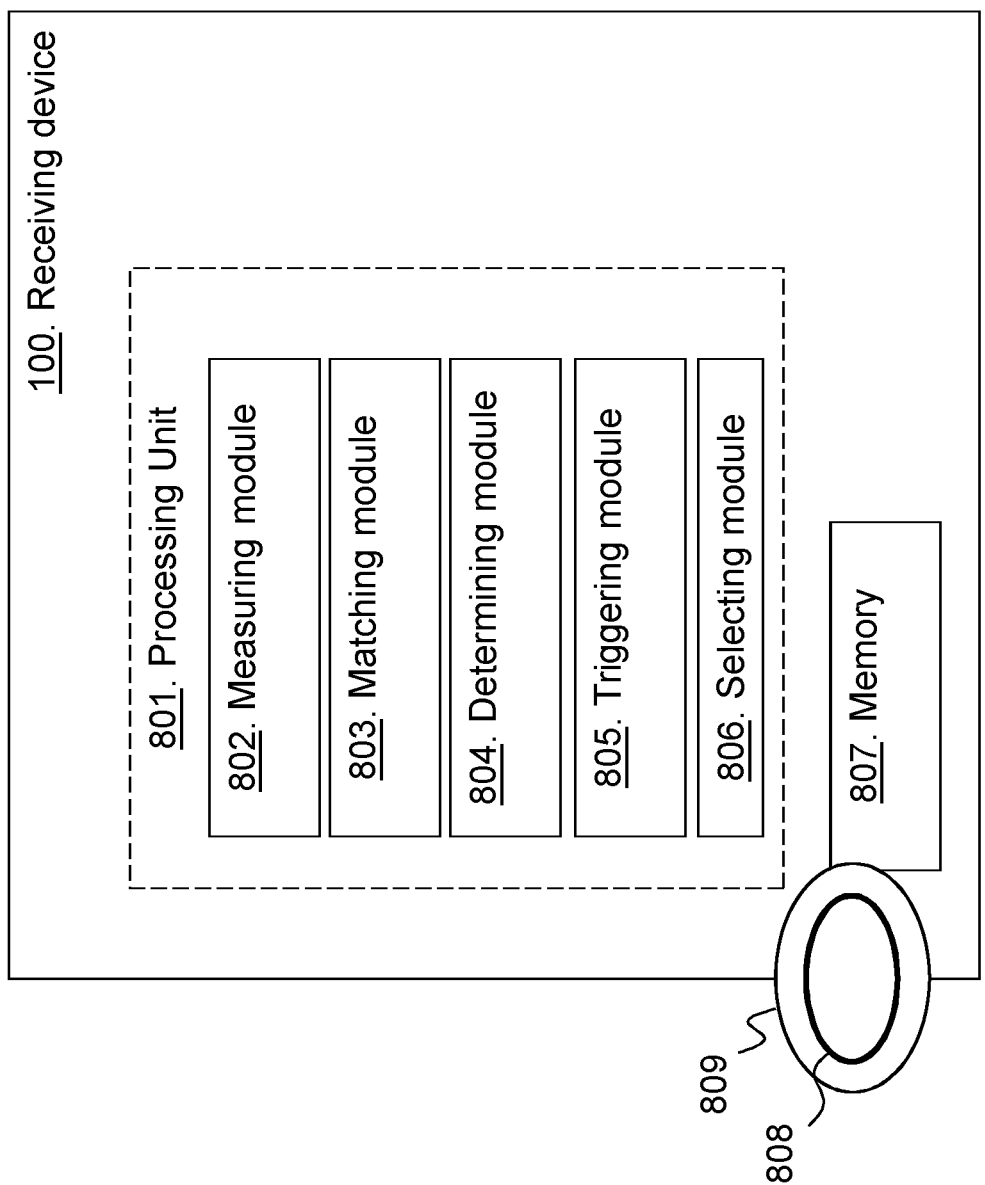
FIG. 8 is a block diagram depicting a receiving device according to embodiments herein.

FIG. 8 is a block diagram depicting a receiving device 100, such as the wireless device 10 of the radio network node 12, for handling signalling in the wireless communication network according to embodiments herein.

The receiving device 100 may comprise processing unit 801, e.g. one or more processors, being configured to perform the methods herein.

The receiving device 100 may comprise a measuring module 802. The receiving device 100, the processing unit 801 and/or the measuring module 802 is configured to measure the strength or complex amplitude of one or more signals over the signal path to the transmitting device. The measured strength or complex amplitude forms the signal pattern over the time. For example, path loss may be measured using the signal strength or quality of one or more signals over the time interval forming the signal pattern over the time interval.

The receiving device 100 may comprise a matching module 803. The receiving device 100, the processing unit 801 and/or the matching module 803 is configured to match the signal pattern with the stored signal pattern. The receiving device 100, the processing unit 801 and/or the matching module 803 may be configured to match the signal pattern with the stored signal pattern by being configured to identify strong delay samples corresponding to carrier frequency blocking. The receiving device 100, the processing unit 801 and/or the matching module 803 may be configured to match the signal pattern with the stored signal pattern by being configured to compare the one or several spectral components, by means of DFT, FFT, or any equivalent method, of the one or more signals with the threshold and when exceeding the threshold, the signal pattern matches or is considered to match the stored signal pattern.

The receiving device 100 may comprise a determining module 804. The receiving device 100, the processing unit 801 and/or the determining module 804 is configured to, in case the signal pattern matches the stored signal pattern; determine that an object will block the signal path between the receiving device and the transmitting device.

The receiving device 100 may comprise a triggering module 805. The receiving device 100, the processing unit 801 and/or the triggering module 805 is configured to, in case determined that the object will block the signal path between the receiving device and the transmitting device, e.g. a blocking object is approaching, trigger the signal process to avoid signal interruption by taking into account that the object will block the signal path. The signal process may comprise one or more of: apply an increased code rate, apply a higher transmit power, initiate a search for alternative cells, initiate a search for alternative transmission antennas, and transmit an indication that the object will block the signal path to the transmitting device.

The receiving device 100 may comprise a selecting module 806. The receiving device 100, the processing unit 801 and/or the selecting module 806 may be configured to select the one or more spectral components as the trigger based on monitoring peak-to-average ratio of the spectral component method output. E.g. an FFT tap is selected as a trigger based on monitored peak-to-average ratio of an FFT output.

The receiving device 100 further comprises a memory 807. The memory comprises one or more units to be used to store data on, such as FFT taps, signal strengths, thresholds, signal patterns, time intervals, applications to perform the methods disclosed herein when being executed, and similar.

The methods according to the embodiments described herein for receiving device 100 are respectively implemented by means of e.g. a computer program 808 or a computer program product, comprising instructions, i.e., software code portions, which, when executed on at least one processor, cause the at least one processor to carry out the actions described herein, as performed by the receiving device 100. The computer program 808 may be stored on a computer-readable storage medium 809, e.g. a disc or similar. The computer-readable storage medium 809, having stored thereon the computer program, may comprise the instructions which, when executed on at least one processor, cause the at least one processor to carry out the actions described herein, as performed by the receiving device 100. In some embodiments, the computer-readable storage medium may be a non-transitory computer-readable storage medium.

In some embodiments a more general term "radio network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Radio remote Unit (RRU), Remote Radio Head (RRH), nodes in distributed antenna system (DAS), core network node (e.g. Mobile Switching Centre (MSC), Mobility Management Entity (MME) etc), Operation and Maintenance (O&M), Operation Support system (OSS), Self-Organizing Network (SON), positioning node (e.g. Evolved Serving Mobile Location Centre (E-SMLC)), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device to device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a receiving device for handling signalling in a wireless communication network, the method comprising:
measuring one of a strength or a complex amplitude, of at least one signal over a signal path to a transmitting device, wherein the measured one of the strength or the complex amplitude forms a signal pattern over a time;
matching the signal pattern with a stored signal pattern;
if the signal pattern matches the stored signal pattern:
predicting that an object will block the signal path between the receiving device and the transmitting device; and
triggering a signal process to avoid signal interruption by taking into account that the object will block the signal path.

2. The method according to claim 1, wherein the signal process comprises at least one of: applying an increased code rate, applying a higher transmit power, initiating a search for alternative cells, initiating a search for alternative transmission antennas, initiating a search for alternative transmit antenna array beamforming weights, and transmitting an indication of the object to the transmitting device.

3. The method according to claim 2, wherein the matching the signal pattern with the stored signal pattern comprises identifying strong delay samples corresponding to carrier frequency blocking.

4. The method according to claim 1, wherein the matching the signal pattern with the stored signal pattern comprises identifying strong delay samples corresponding to carrier frequency blocking.

5. The method according to claim 1, wherein the matching comprises comparing at least one spectral component, using one of a Discrete Fourier Transformation (DFT), or a Fast Fourier Transform (FFT), of the at least one signal with a threshold and when the at least one spectral component exceeds the threshold, the signal pattern matches the stored signal pattern.

6. The method according to claim 5, further comprising:
selecting the at least one spectral component as a trigger based on monitoring peak-to-average ratio of a spectral component method output.

7. A receiving device for handling signalling in a wireless communication network, the receiving device configured to:
measure a strength or a complex amplitude, of one or more signals over a signal path to a transmitting device, wherein the measured strength or the complex amplitude forms a signal pattern over a time;
match the signal pattern with a stored signal pattern;
in case the signal pattern matches the stored signal pattern:
predict that an object will block the signal path between the receiving device and the transmitting device; and
trigger a signal process to avoid signal interruption by taking into account that the object will block the signal path.

8. The receiving device according to claim 7, wherein the signal process comprises at least one of: apply an increased code rate, apply a higher transmit power, initiate a search for alternative cells, initiate a search for alternative transmission antennas, initiate a search for alternative transmit antenna array beamforming weights, and transmit an indication of the object to the transmitting device.

9. The receiving device according to claim 8, being configured to match the signal pattern with the stored signal pattern by being configured to identify strong delay samples corresponding to carrier frequency blocking.

10. The receiving device according to claim 7, being configured to match the signal pattern with the stored signal pattern by being configured to identify strong delay samples corresponding to carrier frequency blocking.

11. The receiving device according to claim 7, being configured to match the signal pattern with the stored signal pattern by being configured to compare at least one spectral component, using one of a Fast Fourier Transform (FFT), or a Discrete Fourier Transform (DFT), of the one or more signals with a threshold and when the at least one spectral component exceeds the threshold, the signal pattern matches the stored signal pattern.

12. The receiving device according to claim 11, further being configured to select the at least one spectral component as a trigger based on monitoring peak-to-average ratio of a spectral component method output.

13. A non-transitory computer-readable storage medium, having stored thereon a computer program comprising instructions which, when executed on at least one processor, cause the at least one processor to carry out a method performed by a receiving device for handling signalling in a wireless communication network, the method comprising:
measuring one of a strength or a complex amplitude, of at least one signal over a signal path to a transmitting device, wherein the measured one of the strength or the complex amplitude forms a signal pattern over a time;
matching the signal pattern with a stored signal pattern;
if the signal pattern matches the stored signal pattern:
predicting that an object will block the signal path between the receiving device and the transmitting device; and
triggering a signal process to avoid signal interruption by taking into account that the object will block the signal path.

* * * * *